Patented Sept. 11, 1934

1,973,320

UNITED STATES PATENT OFFICE 1,973,320

ANTIKNOCK COMPOSITION

Arnold Pacyna, Lyndhurst, N. J.

No Drawing. Application October 29, 1931,
Serial No. 571,853

7 Claims. (Cl. 44—9)

This invention relates to means for preventing carbon deposits, smelly and obnoxious exhaust, and obviating or reducing the pinking or knock, in internal combustion engines.

According to this invention carbon deposits, smelly and obnoxious exhaust and pinking or knock is obviated or reduced by the presence of uranium and vanadium vapors, or the vapors of a uranium and vanadium compound, in the engine cylinders.

Introduction of the vapors into the cylinders may be effected by various methods.

By one method uranium and vanadium oxide is vaporized outside the engine cylinders by means of an electric arc, for example, and the vapors carried thereto by a stream of air or other gases. By another method a solution made of uranium and vanadium chlorides, or oxychlorides, dissolved in acetone, is sprayed into the cylinders where it becomes vaporized by the heat.

Particularly suitable is a compound made by heating together uranium and vanadium chlorides, or oxychlorides, with anhydrous lanolin and a small amount of xylidine, and dissolving the resultant paste in acetone; as this compound is soluble in petroleum fractions it can be added direct to the fuel. However, I do not limit my invention to this compound; I can use any of the following compounds:—uranium and vanadium benzylates, uranium and vanadium phenyl-ethylates, uranium and vanadium oleates, uranium and vanadium amyl alcoholates, uranium and vanadium acetoacetate, as these bodies are soluble in petroleum fractions. Or the material or compound of uranium and vanadium insoluble in the fuel, may be suspended therein.

It will be evident that the invention may involve, according to the method of carrying it out, the modification of the engine itself or the manufacturing of a new fuel.

It is well known in the arts that uranium and vanadium oxides act as catalysts in the vapor phase by making oxidations of organic substances much more energetic and complete.

I am aware that a patent has been granted in respect of a process for increasing the critical compression pressure of a fuel for use in internal combustion engines, which consists in incorporating therein a compounded metallic element which increases the critical compression of the fuel and thus prevents fuel knock.

It may be remarked that the values of the vaporized uranium and vanadium oxides are not considered solely for their pink or knock reducing values, for it has been found that in internal combustion engines carbon deposits tend to defeat the purpose for which the anti-knock substance is intended, because these deposits lower the efficiency of the engine and neutralize any advantage gained. My invention does not, therefore, come under the category of a purely anti-knock substance but is intended not only to reduce the knock or pink but also to increase the efficiency of the engine by preventing the harmful deposition of carbon and to enhance the value of the anti-knock fuel.

Example 1

A cheap and efficient spraying mixture is made as follows:

85 grams uranyl oxychloride $UO_2Cl_2$
15 grams vanadium oxydichloride $V_2O_2Cl_4$ The above is added to 300 c. c. of cold acetone and let stand for one hour when it is all dissolved and ready for spraying into the cylinders of an internal combustion engine. One quarter ounce to each cylinder will last for a considerable time without renewal depending on the use of the engine.

Example 2

A cheap and efficient uranium and vanadium compound, soluble in petroleum fraction, is made as follows:

85 grams uranyl oxychloride $UO_2Cl_2$
15 grams vanadium oxydichloride $V_2O_2Cl_4$ The above is added to 100 grams of anhydrous lanolin known as crude cholesterol and heated to 200° C., for one hour; the mixture becomes dark in color and fumes; allow to cool and add 25 grams xylidine and again heat to 150° C., for a short time; allow to cool and dissolve in 300 c. c. acetone. This solution is used in the proportion of one ounce to ten gallons of petroleum fraction.

What is claimed as new is:

1. A liquid motor fuel containing in solution a mixture of uranium and vanadium chlorides.

2. A mixture for introduction into the cylinders of internal combustion engines to prevent knock or pinking and the deposition of carbon, said mixture comprising uranium and vanadium chlorides dissolved in a solvent therefor, the amount of uranium chloride being substantially greater than the amount of vanadium chloride.

3. A mixture for addition to motor fuels to prevent knock or pinking and the deposition of carbon, said mixture comprising uranium and vanadium chlorides dissolved in lanolin, xylidine and acetone.

4. A mixture for addition to motor fuels to prevent knock or pinking and the deposition of carbon, said mixture comprising 85 grams of uranium chloride and 15 grams of vanadium chloride dissolved in 10 grams of lanolin, 25 grams of xylidine and 300 grams of acetone.

5. A method for preparing an anti-knock mixture soluble in a petroleum fraction which comprises adding uranium and vanadium chlorides to anyhdrous lanolin, heating the mixture, then cooling and adding xylidine, again heating the foregoing mixture, cooling and dissolving in acetone.

6. A method for preparing an anti-knock mixture soluble in a petroleum fraction which comprises adding 85 grams of uranium chloride and 15 grams of vanadium chloride to 10 grams of lanolin, heating the mixture, then cooling and adding 25 grams of xylidine, again heating the foregoing mixture, cooling and dissolving in 300 grams of acetone.

7. A mixture for introduction into the cylinders of internal combustion engines to prevent knock or pinking and the deposition of carbon, said mixture comprising 85 grams of uranium chloride and 15 grams of vanadium chloride dissolved in acetone.

ARNOLD PACYNA.